US007634337B2

(12) United States Patent
Brozovich et al.

(10) Patent No.: US 7,634,337 B2
(45) Date of Patent: Dec. 15, 2009

(54) VEHICLE OR ENGINE DIAGNOSTIC SYSTEMS WITH ADVANCED NON-VOLATILE MEMORY

(75) Inventors: Steven Brozovich, Santa Clara, CA (US); Robert Hoevenaar, De Weere (NL)

(73) Assignee: Snap-On Incorporated, Pleasant Prairie, WI (US)

( * ) Notice: Subject to any disclaimer, the term of this patent is extended or adjusted under 35 U.S.C. 154(b) by 847 days.

(21) Appl. No.: 11/023,417

(22) Filed: Dec. 29, 2004

(65) Prior Publication Data

US 2006/0142905 A1 Jun. 29, 2006

(51) Int. Cl.
*G01M 17/00* (2006.01)

(52) U.S. Cl. .......................................... 701/29; 701/35

(58) Field of Classification Search ............. 701/29–36, 701/99, 10, 102, 110, 11; 714/25, 100; 702/182–188
See application file for complete search history.

(56) References Cited

U.S. PATENT DOCUMENTS

| | | | | |
|---|---|---|---|---|
| 5,173,873 | A | 12/1992 | Wu et al. | |
| 5,850,209 | A | 12/1998 | Lemke et al. | |
| 6,084,796 | A | 7/2000 | Kozicki et al. | |
| 6,115,927 | A | 9/2000 | Hendrix | |
| 6,236,917 | B1 | 5/2001 | Liebl et al. | |
| 6,556,202 | B1 | 4/2003 | Taraki et al. | |
| 6,615,120 | B1 | 9/2003 | Rother | |
| 6,635,914 | B2 | 10/2003 | Kozicki et al. | |
| 6,691,064 | B2 | 2/2004 | Vroman | |
| 6,757,521 | B1 | 6/2004 | Ying | |
| 6,874,680 | B1 | 4/2005 | Klaus et al. | |
| 7,015,500 | B2 | 3/2006 | Choi et al. | |
| 7,233,846 | B2 * | 6/2007 | Kawauchi et al. | 701/29 |
| 7,366,596 | B2 * | 4/2008 | Kawauchi et al. | 701/29 |
| 2003/1002075 | | 1/2003 | Cancilla et al. | |
| 2003/1018248 | | 9/2003 | Schmeisser | |
| 2003/0194865 | A1 | 10/2003 | Gilton | |
| 2004/0044838 | A1 | 3/2004 | Nickel et al. | |

(Continued)

FOREIGN PATENT DOCUMENTS

GB 2 290 631 A 1/1996

(Continued)

OTHER PUBLICATIONS

Merritt, Rick, "Memories may mark early beachhead for nanotech" EE Times, Nov. 5, 2004, pp. 1-4. <http://www.eet.com/semi/news/showArticle.jhtml;jsessionid=FGPCL1W51QTQCQSNDBESKHA?articleId=52200086>.

(Continued)

*Primary Examiner*—Richard M. Camby
(74) *Attorney, Agent, or Firm*—McDermott Will & Emery LLP

(57) ABSTRACT

A programmable vehicle or engine diagnostic tool includes an interface for receiving a signal relating to a performance parameter of the vehicle or engine, a user interface, and a central processing unit, for processing the signal to generate information for presentation to the user. To facilitate fast boot yet enable re-programming of the diagnostic tool, the system utilizes a non-volatile random access memory main memory for the processor based tool, to store the programming for execution by the central processing unit. Disclosed examples of suitable memories include magnetoresistive random access memory (MRAM), carbon nanotube random access memory (CN-RAM) and programmable metallization memory cell (PMC) memory.

18 Claims, 2 Drawing Sheets

U.S. PATENT DOCUMENTS

| | | | |
|---|---|---|---|
| 2004/0044849 | A1 | 3/2004 | Stence et al. |
| 2004/0128844 | A1 | 7/2004 | Robb et al. |
| 2004/1017217 | | 9/2004 | Nagai et al. |
| 2004/0213044 | A1 | 10/2004 | Seyyedy et al. |
| 2004/0214367 | A1 | 10/2004 | Segal et al. |
| 2006/0142906 | A1 | 6/2006 | Brozovich et al. |

FOREIGN PATENT DOCUMENTS

| | | | |
|---|---|---|---|
| JP | 2003-104137 | A | 4/2003 |
| JP | 2003-069936 | A | 7/2003 |

OTHER PUBLICATIONS

Wilson, Ron, "Semico conference showcases nonvolatile understudies" EE Times, Nov. 5, 2004, pp. 1-4, <http://www.eet.com/semi/news/showArticle.jhtml?articlID=52200177>.

IEEE Circuits & Devices Magazine, "Memories of Tomorrow", Reohr et al., published Sep. 2002, pp. 17-27.

HAL PC Magazine, "Memory-Past, Present, and Future, Part 3 of 3", Ron Fenley, published May 4, 2004 (12 pages).

EE Times Online, "Motorola to demo 1-Mbit magnetoresistive RAM", David Lammers, published Jun. 10, 2002 (3 pages).

EE Times Online, "Nantero reports 10-Gbit nanotube memory array", Peter Clarke, published May 8, 2003 (2 pages).

NewScientist.com publication, "Nanotube chip could hold 10 gigabits", Will Knight, published Jun. 17, 2003 (2 pages), http://newscientist.com/article.ns?id=dn3838&print=true.

Physorg.com, "Axon Licenses Programmable Metallization Technology", published Oct. 6, 2004, (3 pages).

Office Action issued in U.S. Appl. No. 11/023,565 on Jun. 23, 2008.

* cited by examiner

VEHICLE OR ENGINE DIAGNOSTIC SYSTEMS WITH ADVANCED NON-VOLATILE MEMORY

TECHNICAL FIELD

The teachings herein relate to techniques and equipment for analyzing, testing and/or diagnosing engine or vehicle performance characteristics, using programmable processors, with non-volatile nano random access memory (NNRAM) program storage, for example, to facilitate fast boot of the processors and/or to facilitate efficient reprogramming of the equipment.

BACKGROUND

Increasingly, equipment utilized to measure, test and/or diagnose a wide range of vehicle conditions utilize programmable processors. In many cases, these devices use core processing equipment similar to that of a personal computer (PC). Examples of such processor based equipment include image-processing type wheel aligners, image-processing type collision damage assessment systems, vehicle scanners and engine analyzers. In such systems, a programmable unit receives a sensory input signal related to an operational characteristic of the vehicle, processes the signal or data from the signal in accord with one or more of its programs and provides information to a user of the vehicle or to a technician/mechanic (user of the tool). The programmable unit includes an interface device for receiving the sensory input, a processor and a number of memories. The unit may also include one or more storage devices or media, such as a hard drive or other disk drive, for longer term or higher volume storage. The memories and other storage devices store programming for the processor as well as data used or produced by the processor.

The types of memories now commonly used for such vehicle diagnostic tools have drawbacks. For example, when the user first turns on the tool, the device must load programming into working memory and run an internal start-up and diagnostic routine to initialize the processor. This start-up operation is often referred to in the computer and data processing industries as a 'boot' operation. Vehicle mechanics familiar with picking up a wrench and instantly applying it to tighten a bolt are often dissatisfied with having to wait for a processor based tool to boot up. Vehicle technicians want to pick-up a tool and instantly begin working with it, just like they can with a wrench. Major factors in the time needed to boot the tool relate to the memory of the tool, such as the speed of the non-volatile memory that initially supplies programming to random access memory during boot-up and/or the amount of programming that must be loaded from one memory or storage device into the main memory during boot-up.

A desirable feature of processor based diagnostic tools is the ability to run and periodically update various applications programs, to perform a wider array of functions and to keep all such functions as up to date as possible. However, this dictates loading programs into the devices and loading programs from one memory or storage into the main working memory, at boot up and/or during later operations. In hand-held tools, to allow desired reprogramming, the memory often takes the form of a Flash memory. However, these types of memory typically have slow read and write times, and as a result, the tool downloads any program stored in Flash to faster memory for run time. This download procedure can also be slow, resulting in slow boot times.

Hence a need exists for a technique to enhance performance, such as boot time, in diagnostic tools, such as those utilized to for testing or analysis of vehicles.

SUMMARY

As taught in the disclosure below, testing or diagnostic systems for vehicles or engines utilize advanced non-volatile random access memory, essentially as the main memory for processor-based implementation of testing or diagnostic tools. The memory may be a non-volatile nano random access memory (NNRAM), or the memory may be of a type selcted from the group consisting essentially of: magnetoresistive random access memory (MRAM), carbon nanotube random access memory (CN-RAM) and programmable metallization memory cell (PMC) memory. A vehicle or engine diagnostic system, in accord with such teachings, may comprise a non-volatile nano random access memory (NNRAM) and a program stored in the NNRAM. Means are coupled to the NNRAM, for executing the program, so that the system performs a test or diagnostic operation on a vehicle or engine.

A disclosed example of a diagnostic system includes an interface for receiving a signal relating to a performance parameter of the vehicle or engine and a user interface, comprising an output for presenting information to a user of the diagnostic system. A central processing unit executes a processing operation responsive to the signal, so as to generate the information for presentation to the user via the user interface. This example includes a non-volatile nano random access memory (NNRAM) coupled to the central processing unit and programming for execution by the central processing unit stored in the NNRAM. Execution of the programming from the NNRAM by the central processing unit controls the processing operation.

If the system is on-board a vehicle, the user may be an occupant or driver of the vehicle. If the system is a separate tool the user is the user of the tool, typically a mechanic or technician servicing or repairing the vehicle.

Program management methodologies, e.g. for loading programs to an NNRAM in a diagnostic system, also are disclosed. An example of such a method might entail prioritizing software that may be utilized by the system to implement one or more testing or diagnostic functions. A select portion of the software is stored in a non-volatile random access memory serving as the main memory of the system, based on the prioritization. Operation of the system involves booting a processor of the system, and using the software directly from the non-volatile main memory. The prioritization of the software that may be utilized by the system to implement testing or diagnostic function(s) may be modified. If so, the system stores a different select portion of the software in the non-volatile main memory, based on the modified prioritization. Subsequent operation of the system involves booting the processor of the system and uses the different select software directly from the non-volatile main memory.

Several specific examples of techniques for modifying the software prioritization are disclosed. One technique allows manual user modification. Other disclosed modification techniques are automatic, for example based on usage statistics or based on time of year and the types of applications programs that may be desirable at different times of year. Of course, actual systems may use combinations of two or more such procedures, to offer the user both manual and automatic prioritization.

Also disclosed is a program product for a diagnostic tool that comprises a non-volatile nano random access memory (NNRAM) and a program stored in the NNRAM, for execution by a processor of a vehicle or engine diagnostic tool. Execution of the program causes the processor to process an input representative of an operational characteristic of the vehicle or engine to generate information regarding performance of the vehicle or engine for output to a user of the tool.

Another vehicle or engine diagnostic system disclosed herein includes an interface for receiving a signal relating to a performance parameter of the vehicle or engine, a central processing unit and programming for execution by the central processing unit, for controlling processing of the signal by the central processing to implement a diagnostic function. In this system, means are provided for storing the programming. The means for storing may exhibit the following characteristics:

1) Size: Critical dimension (CD) less than 0.06 micron
2) Storage cells are randomly accessible,
3) Non-volatile storage, and
4) Fast read and write access to information stored in the cells, that is to say faster than flash memories and comparable or faster than DRAM or SRAM memories, typically used today in vehicle or engine diagnostic systems. Preferably, the read-write access time is less than 25 ns.

The examples of suitable NNRAM memories or memories suitable for use as the non-volatile main memory or the means for storing, in the systems or products or methods discussed above, include magnetoresistive random access memory (MRAM), carbon nanotube random access memory (CN-RAM) and programmable metallization memory cell (PMC) memory. In many cases, such memories satisfy the requirements outlined above. However, some examples satisfy most but not all of those requirements. Aspects of the present teachings, in some cases, also encompass methods, equipment and products using one or more of these three exemplary memories in processor based diagnostic tools.

Additional objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

As taught herein, diagnostic equipment will utilize NNRAM or will use MRAM, CN-RAM or PMC, essentially as a replacement for stacks of memory, such as typical combinations of one or more of DRAM (dynamic random access memory), SRAM (static random access memory), Flash RAM (flash random access memory), and ROM (read only memory), commonly found in processor based computing and control devices, particularly in portable or handheld diagnostic devices.

As used herein, NNRAM refers to non-volatile nano random access memory. Characteristics of NNRAM include:

1) Size: Critical dimension (CD) less than 0.06 micron
2) Storage cells are randomly accessible,
3) Non-volatile storage, and
4) Fast read and write access, e.g. read-write access time less than 25 ns.

Figure 1:
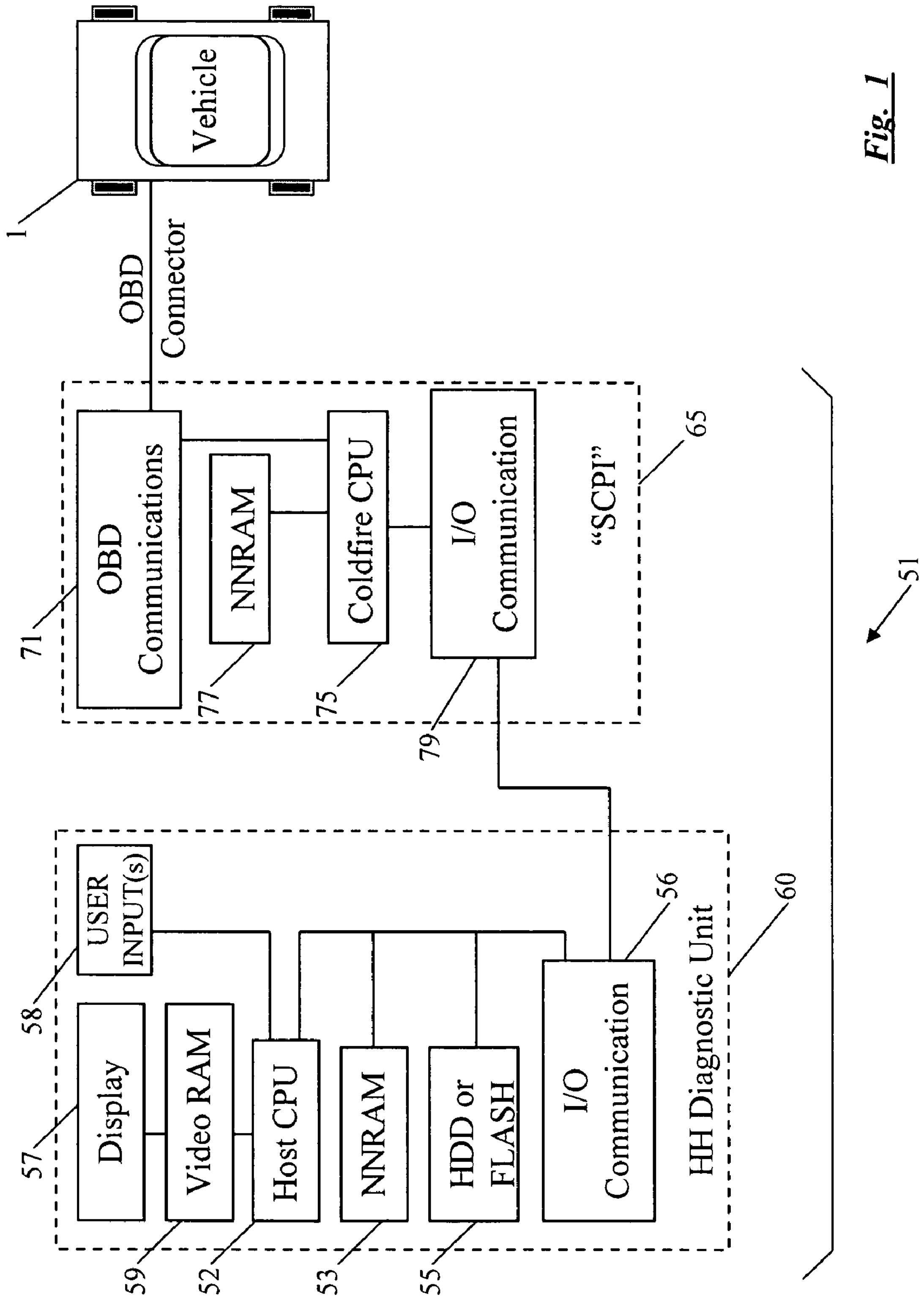
FIG. 1 is a high-level, functional block diagram of an example of a testing or diagnostic system.

There are a wide range of tools that are known and/or readily available for testing or diagnostic analysis of engines and vehicles, which utilize a programmable central processing unit (CPU) and associated memory that stores data for processing by the CPU and program code for execution by the CPU. The present teachings encompass use of NNRAM type memory or the MRAM, CN-RAM or PMC type memories in such programmable processor-based tools. To insure full understanding of the application of these advanced non-volatile memories in such tools and/or advantages thereof, it may be helpful to consider a specific example of a vehicle diagnostic tool utilizing such memory. Reference therefore is made in detail to the examples illustrated in the accompanying drawings and discussed below. FIG. 1 illustrates the functional elements of an exemplary diagnostic tool or system 51, for analysis of one or more operating parameters or characteristics of a vehicle 1.

The exemplary system 51 is a PC based implementation of a handheld diagnostic tool. As shown, many of the system elements are those associated with a general-purpose computer. The exemplary system 51 contains a host central processing unit (CPU) 52 and memories or storage devices 53 and 55 which are connected to the CPU 52, e.g. via an interconnect bus or the like. The CPU 52 may contain a single microprocessor (e.g. a Pentium-x or an x86 microprocessor), or it may contain a plurality of microprocessors for configuring the central processing unit 52 as a multi-processor system.

Main memory stores at least portions of instructions for execution and data for processing by the CPU 52. In the past, such memories would have been implemented as one or a combination of a random access memory (RAM) typically in the form of dynamic random access memory (DRAM) or static random access memory (SRAM), read only memory (ROM) such as a PROM, an EPROM, a FLASH-EPROM, and the like. In the exemplary HH (handheld) diagnostic unit, however, the main memory 53 consists of NNRAM. The main memory could utilize MRAM, CN-RAM or PMC memory, which meets some but not all of the above requirements for NNRAM, however, for discussion purposes it is assumed that memories 53 and 55 consist of one or more of those exemplary memories satisfying the above-discussed NNRAM characteristics.

The NNRAM 53 acts both as the working memory of the CPU 52 during program execution and as the long term storage of at least some of the programming, typically including the boot programming, the operating system and one or more selected application programs. The unit 60 may also include a hard disk drive (HDD) or flash memory 55, for long term storage of additional programs and data. Circumstances are discussed later in which programs are loaded to the NNRAM and/or off-loaded from the NNRAM, e.g. to change the applications that begin running on the device as part of a fast boot-up.

The system 51 may also include one or more input/output interfaces for communications (not shown) for data communications via a network. If provided, such an interface may be a modem, an Ethernet card or any other appropriate data communications device, for digital communications of various types via the network. The physical communication links may be optical, wired, or wireless (e.g. via satellite or cellular network).

The system 51 also includes appropriate interconnection with a display 57 and one or more elements 58 for user input. In an example, the system 51 includes a graphics subsystem (not separately shown) containing video RAM 59, to drive the output display 57 in accord with the programmed operations of the host CPU 52. The output display 57 may include a cathode ray tube (CRT) display, although in applications for handheld diagnostic tools, the display 57 typically is flat panel type device such as a liquid crystal display (LCD). Of course other display technologies may be used.

For user inputs, the handheld (HH) unit 60 may include a series of keys, and the device may include touch sensitive input capability associated with the display 57 for user input purposes. The input device(s) 58 for such an implementation of the system 51 could include other types user input devices, such as a keyboard for inputting alphanumeric and other key information, a cursor control and selection device (not shown), such as a mouse, a trackball, stylus, or cursor direction keys. However, for handheld vehicle diagnostic applications, the number and size of separate input elements are kept to a minimum required to allow ergonomic operation of the particular tool for its expected diagnostic functions.

The links of the input and output elements 57, 58 to the rest of the system 51 may be wired connections or use wireless communications, if the input output elements are remote. In portable or handheld implementations, the input and output elements are hardwired into the system and incorporated into the system housing.

Like any computer system, the diagnostic tool type system 51 runs a variety of applications programs and stores data, enabling one or more interactions via the user interface provided through elements such as 57 and 58, to implement the desired processing, in this case for various diagnostic tool functions. The system 51 may run a number of such programs for different diagnostic purposes, and some tools may run diverse programs useful for the technician, but not directly related to the diagnostic applications (e.g. e-mail). When running, such programs reside in the NNRAM 53. The boot routine and operating system reside in the NNRAM 53 until replaced. Also, at least one or more selected applications stay in NNRAM for relatively long periods of time, although the particular application(s) may change from time to time, e.g. based on user selections or measured usage of different tool applications.

In the exemplary tool configuration of the system 51, the main portion of the system takes the form of a handheld (HH) display device, referred to here as the "HH Diagnostic Unit" 60. As shown, the unit 60 also includes one or more input/output (I/O) communication ports 56, for specific-application type plug-in modules. In an example, the unit 60 may include two ports 56 for concurrent plug-in of two such modules, although the device may be compatible with a larger number of different types of such modules.

Typical examples of the plug-in modules include a digital volt-ohm meter (DVOM) plug-in module, a Labscope plug-in module and a scanner cartridge plug-in module (SCPI). Other exemplary plug-ins may include an oscilloscope module and a gas analyzer module. In operation, one or more of the modules connects to elements in or sensors on a vehicle 1. The modules provide data to the HH unit 60 for diagnostic processing and display in accord with various programs. In the illustrated example, the HH unit 60 is connected to a scanner cartridge plug-in module (SCPI) 65.

FIG. 1 also shows a block diagram of the SCPI plug-in module 63. In the illustrated example, the module 63 includes a communications interface 71 for connection to systems on-board the vehicle 1. The illustrated interface 71 provides the capability to interrogate the major computer systems on the vehicle 1, through a standard OBD II vehicle communication interface connection, although those skilled in the art will recognize that a manufacturer specific vehicle communication interface or other communication interface may be used.

The interface 71 essentially provides two-way data communications between the vehicle system(s) and the central processing unit (CPU) 75 of the SCPI plug-in module 65. The CPU 75 may contain a single microprocessor (e.g. a Pentium-x or an x86 microprocessor), or it may contain a plurality of microprocessors for configuring the central processing unit 75 as a multi-processor system. In the example, the CPU 75 consists of a Coldfire type microprocessor supplied by Motorola. Those skilled in the art will recognize that the CPU may use other microprocessors, digital signal processors or the like. The CPU runs programming from and processes data from and stores data to a memory, in this case implemented by NNRAM type memory 77. The SCPI plug-in module 65 also includes an input/output (I/O) communication port 79, which is compatible with the I/O communication port 56 on the handheld diagnostic unit 60. When connected as shown, the I/O ports 56 and 79 provide two-way data communications between the CPUs 52 and 75.

The SCPI plug-in essentially implements many of the functions of a vehicle diagnostic scanner tool, for scanning and processing sensor and code data provided by a vehicle's on-board diagnostic system. However, overall control of the system 51 and user interface functions are performed by the programmed logic of the HH unit 60.

In the example of FIG. 1, either the HH Diagnostic Unit 60 or the SCPI 65 or both utilize NNRAM memory, as the non-volatile random access main memory of the respective processor(s) 52 and/or 75. Several memory cell technologies have recently been developed, which provide the size and performance characteristics of NNRAM as defined above. These examples of suitable NNRAM include magnetic or magnetoresistive random access memory (MRAM), carbon nanotube random access memory (CN-RAM) and programmable conductor memory or PMC, each of which are briefly discussed below.

Magnetic or magnetoresistive random access memory (MRAM) is any type of memory that utilizes a magnetic memory element. An example of such a memory utilizes a cell that includes ferromagnetic layers separated by a non-magnetic barrier layer that forms a tunnel junction. Alternate directions of magnetization vectors in these ferromagnetic layers define the two states of the memory cell. The two different magnetic states provide two different resistance states, which are detectable as a "1" or a "0" value stored in the cell. MRAM is randomly accessible, can be written or read very quickly, is non-volatile, indefinitely alterable, and consumes relatively little power. At least some examples of MRAM are now using nano-scale technologies.

In a carbon nanotube random access memory (CN-RAM), sometimes alternately referred to as NRAM, the storage elements are nanoscopic wires formed by carbon nanotubes suspended over or between other wires that serve as electrodes for the memory cells. Applying an electrical signal to the electrode(s) of a cell creates an attractive or repulsive force on the carbon nanotube wire. The wire bends and retains its bent state even after the signal is removed. The states of the wire, in contact with an electrode or not in contact with the electrode, define two states of the memory cell. A state is reversed by later applying an opposite signal to the cell electrodes.

The cell of a programmable conductor or programmable metallization memory cell (PMC) utilizes a glass ion conductor, such as a nano-scale electrolyte consisting of ions embedded in a glassy matrix, and on the surface of the glass ion conductor. Applying an electric field to metal electrodes on either side of the matrix causes metal ions to be electrodeposited through the matrix, forming a conductive bridge in a matter of nanoseconds. Reversing the field causes the metal ions to reverse their migration. An electric field applied to the electrodes causes the ions to grow a conductive pathway or bridge between the electrodes. A reverse field reverses the ion migration and tears down the bridge. The resistance and/or capacitance of the cell structure changes with the amount of conductor growth. If the conductor is grown so as to extend completely across the cell, a circuit connection is established between the electrodes, for example, to define one of the two states of the memory. Each state (open/closed) is stable in the absence of an electric field, hence, the cell retains its memory state (“1,” “0”).

Aspects of the present teachings relate to use of the three types of memory to form non-volatile main memories for the CPUs in systems such as system 51 of FIG. 1. Typically, but not in all cases, the MRAM, CN-RAM or PMC memory serving as non-volatile main memory will satisfy the requirements for NNRAM. For example some MRAM memories satisfy all requirements for NNRAM. Other suitable MRAM, however, satisfy many of the requirements but are not yet small enough to be considered ‘nano’ under the definition for NNRAM outlined above.

Boot speed is a problem with most handheld engine or vehicle diagnostic tools. One of the common complaints is the amount of time that it takes to boot a tool up and load applications. Technicians want to be able to pick up the tool and go right to work, just like they can with a wrench. The problem with fast boot is the memory. The system 51 therefore utilizes NNRAM or the specific exemplary non-volatile memories, as main memories, to enhance the fast boot operation.

Also, in such a system 51, it is desirable to have reprogrammable memory to enable an update of the customer’s tool, both with the operating system and the applications, in the example, including those in both the unit 60 and the module 65. This requires memory to be of a programmable type. NNRAM or memories of the exemplary types are programmable, however, use of such memories to facilitate software upgrades does not compromise the boot speed, as was the case with tools utilizing Flash memories. In the exemplary system 51, the unit 60 is reprogrammed or upgraded by adding or replacing programs. Initially, the new or replacement programming is stored in the hard disk drive or flash memory 55 and uploaded to the NNRAM 53 for execution. Once uploaded, however, some or all of the new programming may become resident in and remain in the NNRAM 53 even after power down and re-boot. The plug-in module is reprogrammed or upgraded by adding or replacing programs in the NNRAM 77.

NNRAM or the like allows the tool designer/manufacturer to provide the desired programmability (something that would be lost if a standard ROM were used which would also be fast for OS and application memory). The fast access time and fast read/write (R/W) times of NNRAM or the like make the boot time minimal, since the tool runs the software programming right out of the non-volatile main memory, eliminating the time required to download into fast RAM from Flash or a hard disk drive. This allows an altering of the system architecture in that the memory no longer needs separation into two areas, nonvolatile (slow) RAM and fast SRAM (static RAM) or PSRAM (pseudostatic RAM). Hence, this new architecture also should be cheaper and smaller and typically has longer battery life because of reduced memory circuitry.

For additional capability, the tool could also have flash memory or a hard disk drive where infrequently used applications would reside. In the example of FIG. 1, the HH diagnostic unit 60 includes such a flash memory or a hard disk drive 55. If one of the less-frequently used programs is invoked, the tool loads that program into the NNRAM 53 for execution. Since the upload is a program which is seldom used, the boot time should not be a major annoyance to the user.

However, the programmability and non-volatile nature of the NNRAM or the like offer options to change the programs that remain in the memory for fast boot, the next time the user operates the tool. Essentially, if a user wants a different application program available for the next boot, the application may be kept in the non-volatile main memory 53. If it is necessary to clear space in the memory 53, an application that previously resided in the memory 53 may be offloaded flash memory or a hard disk drive 55. The change in programs resident in the NNRAM 53 may utilize manual selection (FIG. 2) or an automatic selection (FIG. 3).

Consider first the manual selection process, with reference to the flow-chart of FIG. 3 and assume again for purposes of the example that the non-volatile main memory is an NNRAM. At step S1, the user has turned on the diagnostic tool system 51, and the processors 52 and 75 boot using the programming currently resident in their respective NNRAM memories 53, 77. The user can utilize any diagnostic application currently resident in the NNRAM memory 53, and the unit 60 will interact through the SCPI 65 executing programming from memory 77, to perform tests or scans and provide desired vehicle diagnostic information to the user. However, the resident software in the NNRAM memory 53 (an application or part of the operating system) also offers a boot priority set-up option for the user, which the user invokes at step S2 in the example.

As part of the priority set-up routine, the unit 60 provides the user a display of information about available applications, such as the applications currently resident in the NNRAM 53, additional applications available in the hard disk drive or flash memory 55 and possibly applications available from remote sources (e.g. web sites where the user might obtain new versions or additional applications).

At step S3, the user selects one or more applications for priority in future boot-up operations. If the application is not already resident in the NNRAM 53, the CPU copies the selected application from its current location (e.g. from the hard disk drive or flash memory 55) to the NNRAM 53. If necessary to free-up space for a newly selected application, a currently resident application may be deleted (if there is a copy on the hard disk drive or in flash memory) or the currently resident application may be transferred to the hard disk drive or flash memory 55. When the priority selection(s) and attendant program management operation(s) at step S3 are complete, processing returns to main operations (step S4), for example, to run one or more diagnostic tests utilizing an application run from the NNRAM memory 53 by the host CPU 52. In the example, the managed applications are those that would reside in or are moved to/from the NNRAM 53 and run on the host CPU 52, although a similar approach could be used for selection of applications for the SCPI plug-in module 65.

When the user is finished with the tool 51, the user turns off the tool. The newly selected applications moved or copied into the NNRAM 53 or 77 remain in those memories, since both memories 53 and 77 are non-volatile. The next time the user activates the tool 51, the tool boots-up using the programming now resident in the NNRAM memories. The boot operation is fast, because of the speed of the memories, and the re-booted system uses the newly resident programming.

In an alternate or complimentary approach to application management, the selective replacement of programming in the NNRAM is performed in response to application usage statistics obtained during operations of the diagnostic system. The flow-chart of FIG. 3 illustrates the steps of an example of such an automatic process.

In this example, the tool 51 also creates a history of which applications were used most often and changes which programs are stored in the NNRAM 53 or 77, based on those statistics. For instance, the NNRAM 53 contains the operating system and the basic user interface software for responding to user inputs 58 and providing information output via display 57. The user initially (or from time to time) sets up the unit 60 to include the expected most often used application(s) in the NNRAM 53. As the user operates the tool, the user invokes one or more applications from the hard disk drive or flash memory 55, to allow the system to provide the user with additional functionality. Although this other application programming is not initially kept resident in the NNRAM 53, after each use thereof is complete, the unit 52 does record such usage in its statistics.

After monitoring the application usage for many power cycles, the unit 60 automatically stores the most often used application(s) from the hard disk drive or flash memory 55 into the NNRAM 53, removing the less often used application(s). This automatically ensures that the most often used application(s) would boot instantly, while less used application(s) would have to go through a standard boot procedure. The history would be monitored periodically, changing the applications in NNRAM as necessary. For instance, in summer, air conditioning would be a major system that would be looked at often, while in winter, electrical charging systems would be most commonly examined. The tool, by monitoring the history and other factors such as date, could easily change the priority of these applications in the tool memory and bulk storage, to enable fast boot of the highest priority application.

It may be helpful now to consider the steps in the simple example of FIG. 3 in somewhat more detail.

Initially, the user has turned on the diagnostic tool system 51, and the processors 52 and 75 boot using the programming currently resident in their respective NNRAM memories 53, 77. In the HH diagnostic unit 60, this entails boot-up of the operating system software from the NNRAM 53 (step S11) as well as boot-up of the one or more resident applications from the NNRAM 53 (step S12). The user can then Do Work (represented generally by step S13) utilizing any diagnostic application currently resident in the NNRAM memory 53, and the unit 60 will interact through the SCPI 65 executing programming from memory 77, to perform tests or scans and provide desired vehicle diagnostic information to the user. During work (S13), the user also may invoke another application from the hard disk drive or flash memory 55.

At a later time (step S14), the system 51 enters a shutdown sequence. The tool 51 may initiate this sequence if the user attempts to turn-off the power, if the tool has remained inactive for some extended period, if battery power falls below a safety threshold, etc. Steps S15-S19 represent the part of the shut-down procedure of interest to the application management concepts under consideration here.

In step S15, the host CPU 52 determines if during the work at step S13 since the latest boot (S11) the technician user requested a new application, e.g. from the hard disk drive or flash memory 55. If the determination at step S15 indicates that the technician did not select a new application during the latest work session, the processing branches to step S19, in which the host CPU shuts downs the system 51 by executing an appropriate shutdown procedure for the particular system.

However, if determination at step S15 indicates that the technician did select a new application during the latest work session, the processing branches to step S16. At step S16, the host CPU 52 increments the application statistics counter for the newly requested application (or for each newly requested application, if the technician selected a plurality of new applications during the latest work session).

In step S17 the host CPU 52 examines the updated statistics counter(s) to determine if it is appropriate to update the application boot priority. The CPU may compare the latest count of selections for a particular application that currently resides in the hard disk drive or flash memory 55 to a threshold or to usage statistics for one or more applications currently resident in the NNRAM 53. The decision at step S17 may implement more complicated usage analysis algorithms, for example, to take into account other factors, such as the date or time of the year in the air conditioning versus charging system example discussed above.

If the statistical analysis at step S17 indicates that the criteria for an update has not been met, then processing branches to step S19, in which the host CPU shuts downs the system 51 by executing the appropriate shutdown procedure for the particular system. However, if the statistical analysis at step S17 indicates that the criteria for an update has been met, then processing branches to step S18. In that step, the CPU 52 moves any new application whose statistics met the criteria into the NNRAM 53, e.g. from the hard disk drive or flash memory 55. As noted, less frequently used applications may be removed from the NNRAM 53 to free-up space. After the application update at S18 is complete, processing reaches step S19, in which the host CPU 52 shuts down the system 51.

Vehicle or engine diagnostic operations, including those described above and many others, are carried out by execution of software, firmware, or microcode operating on a digital signal processor, microprocessor, computer of any type or any other programmable central processing unit. Code for implementing such diagnostic operations may be in the form of computer instructions in any form (e.g. source code, object code, interpreted code, etc.) stored in or carried by any machine readable media, but particularly in an NNRAM type memory or in one of the three exemplary types of memory (MRAM, CN-RAM, PMC). Program aspects of the technology may be thought of a "products," typically in the form of executable code and/or associated data that is carried on or embodied in the particular type of memory, or in some cases in another type of machine readable medium.

In one aspect, a program product for a diagnostic tool comprises a non-volatile nano random access memory (NNRAM) and a program stored in the NNRAM, for execution by a processor of a vehicle or engine diagnostic tool. Execution of the program causes the processor to process signals representative of an operational characteristic of the vehicle or engine to generate information regarding performance of the vehicle or engine for output to a user of the tool. In a similar aspect a memory carrying such a program is of a type selected from the group consisting of magnetoresistive random access memory (MRAM), carbon nanotube random access memory (CN-RAM) and programmable metallization memory cell (PMC) memory.

Figure 2:
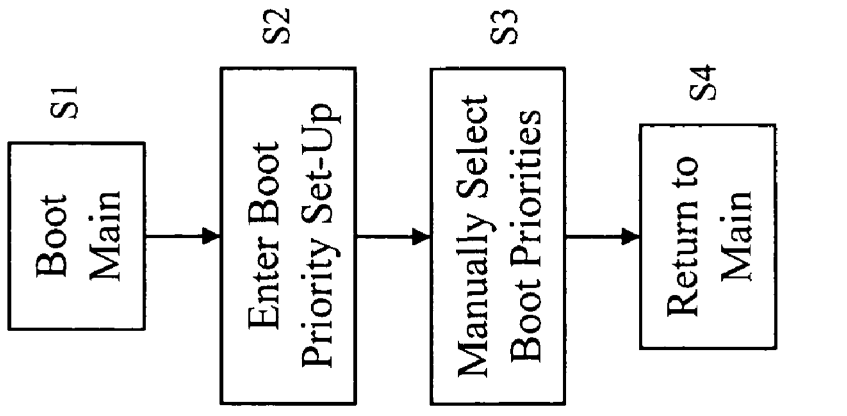
FIG. 2 is a flow-chart, useful in understanding an exemplary process for manually selecting boot priorities for programming in a testing or diagnostic system.
Figure 3:
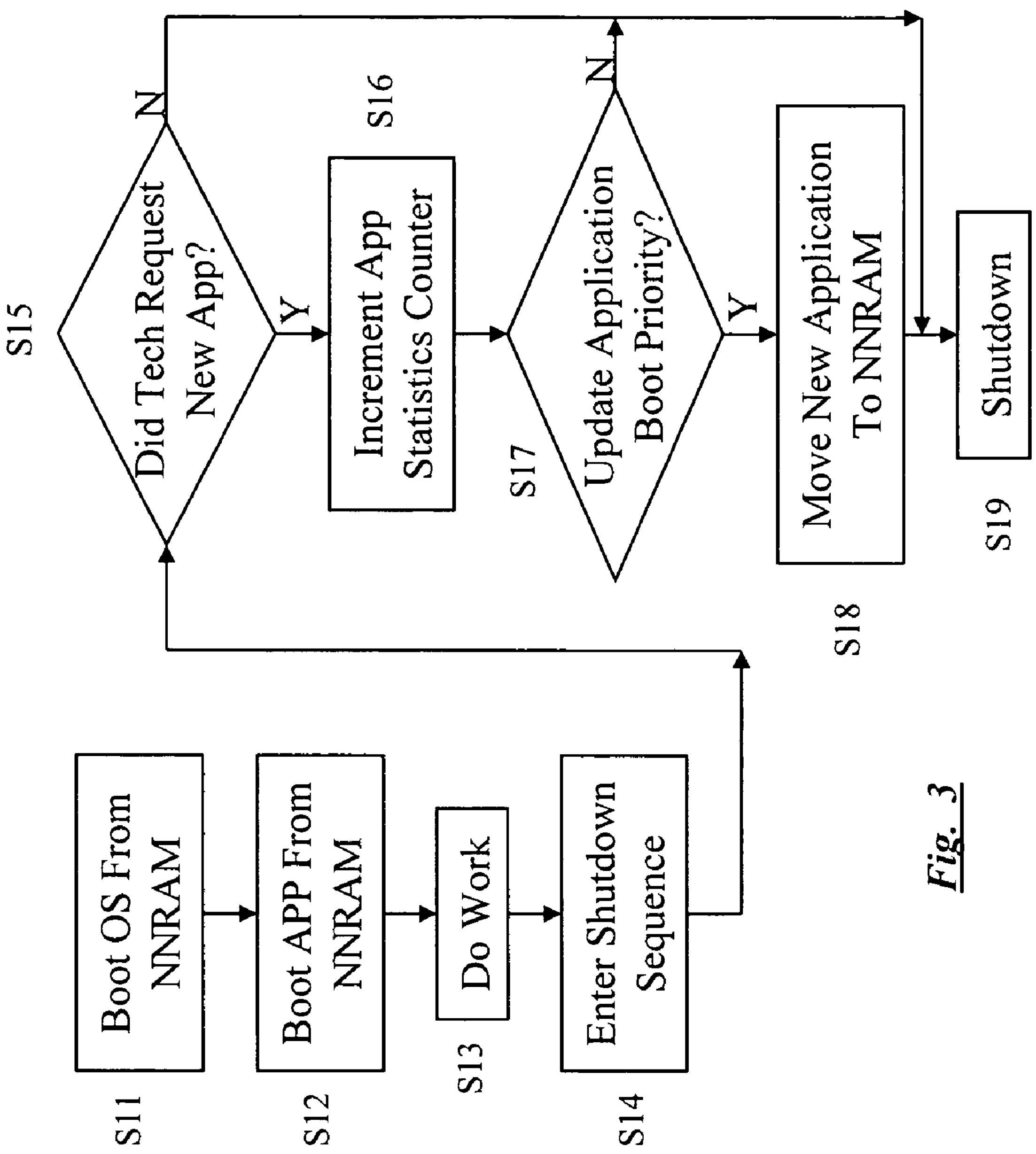
FIG. 3 is a flow-chart, useful in understanding an exemplary process for automatically setting boot priorities for programming in a testing or diagnostic system.

The programming for implementing the application manipulation, such as the routines of FIGS. 2 and 3 for movement of applications between the non-volatile main memory and other storage, may at times reside in other machine readable media. For example, such programming may at times be communicated to the tool for loading into the non-volatile main memory and/or into the hard disk drive or flash memory. In such scenarios, the programming may initially reside in storage of a computer, server or host, and then be communicated through a local interface, through the Internet or through various other telecommunication networks to the tool or to another device that initially loads programming into the hard disk drive or flash memory and/or into the non-volatile main memory.

Terms regarding computer or machine "readable medium" (or media) as used herein therefore encompass any and all physical media or transmission media that may participate in providing instructions or code or data to a processor or the like for execution or processing. Such media may take many forms, including but not limited to, NNRAM type memories, MRAM, CN-RAM, PMC memories, other non-volatile media and volatile media, as well as carrier wave media and physical transmission media that bear or transport such carrier waves.

The examples described above have focused on testing and/or diagnostic tools used for engines and/or vehicles, typically automobiles, trucks, etc. It will be apparent that such examples may be used with different vehicles and/or to diagnose different types of vehicle systems. For example, the tools disclosed herein may include or be utilized with any appropriate voltage source, such as a battery, an alternator and the like, providing any appropriate voltage, such as about 12 Volts, about 42 Volts and the like, either as the power source for the tool itself of for diagnosis of equipment generating or operating on such voltages. Furthermore, an engine analyzer example may be used with any desired system or engine. Those systems or engines may comprise items utilizing fossil fuels, such as gasoline, natural gas, propane and the like, electricity, such as that generated by battery, magneto, solar cell and the like, wind and hybrids or combinations thereof. Any of those systems or engines may be incorporated into another system, such as an automobile, a truck, a boat or ship, a motorcycle, farm equipment, lawn or garden equipment, a generator, an airplane and the like. Of course, the diagnostic tools and the relevant concepts disclosed herein may find wide application in other fields, where testing and monitoring of test results particularly using handheld systems is desirable.

The system illustrated in FIG. 1 represents just one example of the general types of testing and/or diagnostic systems that may benefit from use of NNRAM or similar types of non-volatile random access main memory in accord with the present teachings. Those skilled in the art will understand and recognize that such memories may be used in a wide variety of other processor-based vehicle or engine diagnostic systems. Just a few examples of such other systems are disclosed in the following documents: U.S. Pat. No. 6,115,927 to Hendrix; U.S. Pat. No. 6,556,202 to Taraki et al.; U.S. Pat. No. 6,615,120 to Rother; US application publication no. 2003/0020759 to Cancilla et al.; US application publication no. 2003/0182485 to Schmeisser; US application publication no. 2004/0128844 to Robb et al.; and US application publication no. 2004/0172177 to Nagai et al., the disclosures of which are entirely incorporated herein by reference.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A vehicle or engine diagnostic system, comprising:

an interface for receiving a signal relating to a performance parameter of the vehicle or engine;

a user interface, comprising an output for presenting information to a user of the diagnostic system;

a central processing unit, for performing a processing operation responsive to the signal to generate the information for presentation to the user;

a non-volatile nano random access memory (NNRAM) coupled to the central processing unit, the NNRAM serving as random access main memory for the central processing; and programming stored in the NNRAM, the programming comprising an operating system and at least one vehicle or engine diagnostic application program for execution by the central processing unit directly from the NNRAM memory serving as the random access main memory for the central processing unit, wherein execution of the programming directly from the NNRAM by the central processing unit controls the processing operation of the central processing unit with regard to one or more vehicle or engine diagnostic functions of the system.

2. The system of claim 1, wherein the NNRAM comprises a memory selected from the group consisting essentially of: magnetoresistive random access memory (MRAM), carbon nanotube random access memory (CN-RAM) and programmable metallization memory cell (PMC) memory.

3. The system of claim 1, further comprising an additional program storage containing at least one additional vehicle or engine diagnostic application program, for loading into the NNRAM for execution by the central processing unit.

4. The system of claim 3, wherein the operating system enables the central processing unit to selectively replace the at least one vehicle or engine diagnostic application program stored in the NNRAM with the at least one additional vehicle or engine diagnostic application program.

5. The system of claim 4, wherein the selective replacement is performed in response to a selection input by the user.

6. The system of claim 4, wherein the selective replacement is performed in response to application usage statistics obtained during operations of the diagnostic system.

7. The system of claim 1, further comprising a portable housing for handheld manipulation by the user, the housing containing at least the user interface, the central processing unit and the NNRAM.

8. The system of claim 1, further comprising:
a portable unit for handheld manipulation by the user, the portable unit containing at least the user interface;
a module housing at least the interface, the central processing unit and the NNRAM; and
an interconnection for data communication between the portable unit and module.

9. A vehicle or engine diagnostic system, comprising:
an interface for receiving a signal relating to a performance parameter of the vehicle or engine;
a user interface, comprising an output for presenting information to a user of the diagnostic system;
a central processing unit, for performing a processing operation responsive to the signal to generate the information for presentation to the user;
a non-volatile random access memory coupled to the central processing unit, the non-volatile random access memory serving as main memory for the central processing unit, the non-volatile random access memory comprising a memory selected from the group consisting essentially of: magnetoresistive random access memory (MRAM), carbon nanotube random access memory (CN-RAM) and programmable metallization memory cell (PMC) memory; and
programming stored in the non-volatile random access memory, the programming comprising an operating system and at least one vehicle or engine diagnostic application program for execution by the central processing unit directly from the non-volatile random access memory serving as the main memory for the central processing unit,
wherein execution of the programming directly from the non-volatile random access memory by the central processing unit controls the processing operation of the central processing unit with regard to one or more vehicle or engine diagnostic functions of the system.

10. The system of claim 9, further comprising an additional program storage containing at least one additional vehicle or engine diagnostic application program, for loading into the non-volatile random access memory for execution by the central processing unit.

11. The system of claim 10, wherein the operating system enables the central processing unit to selectively replace the at least one diagnostic application program stored in the non-volatile random access memory with the at least one additional diagnostic application program.

12. The system of claim 11, wherein the selective replacement is performed in response to a selection input by the user.

13. The system of claim 11, wherein the selective replacement is performed in response to application usage statistics obtained during operations of the diagnostic system.

14. The system of claim 9, further comprising a portable housing for handheld manipulation by the user, the housing containing at least the user interface, the central processing unit and the non-volatile random access memory.

15. The system of claim 9, further comprising:
a portable unit for handheld manipulation by the user, the portable unit containing at least the user interface;
a module housing at least the interface, the central processing unit and the non-volatile random access memory; and
an interconnection for data communication between the portable unit and module.

16. The system of claim 1,
wherein the NNRAM has the following characteristics:
1) a critical dimension (CD) of storage cells of the NNRAM is less than 0.06 micron,
2) the storage cells are randomly accessible,
3) the storage cells provide non-volatile storage, and
4) the NNRAM provides read and write access to information stored in the storage cells in times less than 25 ns.

17. The system of claim 1, wherein the NNRAM is configured to enable the operating system and the at least one vehicle or engine diagnostic application program to remain resident in the NNRAM main memory through a power-down of the system and to be initially available in the NNRAM main memory for execution by the central processing upon re-boot of the system.

18. The system of claim 9, the non-volatile random access memory is configured to enable the operating system and the at least one vehicle or engine diagnostic application program to remain resident in the non-volatile random access main memory through a power-down of the system and to be initially available in the non-volatile random access main memory for execution by the central processing upon re-boot of the system.

* * * * *